April 9, 1957  P. L. GUARIN  2,788,080
LIQUID AND GAS SEPARATOR
Filed Feb. 24, 1955
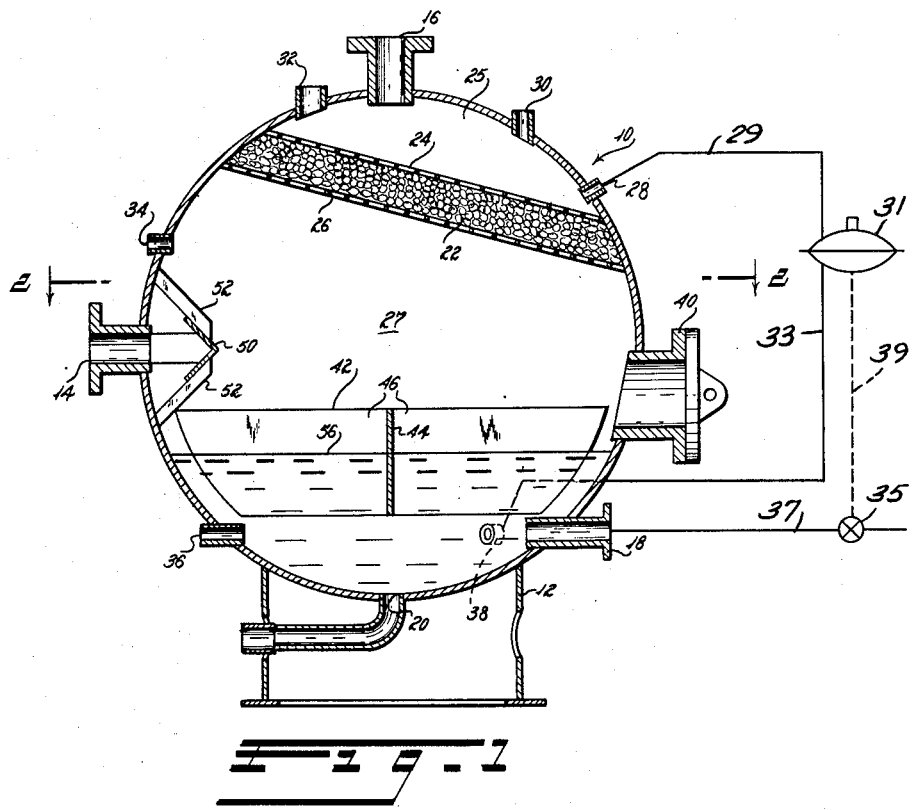
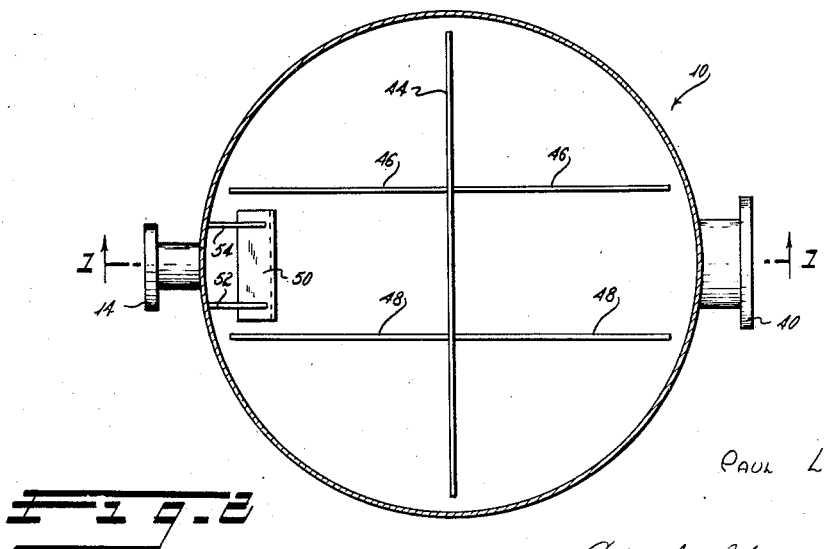
INVENTOR
Paul L. Guarin
BY Strauch, Nolan & Diggins
ATTORNEYS – # United States Patent Office 2,788,080
Patented Apr. 9, 1957

2,788,080

LIQUID AND GAS SEPARATOR

Paul L. Guarin, Houston, Tex., assignor to Delta Tank Manufacturing Co., Inc., Baton Rouge, La., a corporation of Louisiana Application February 24, 1955, Serial No. 490,282

4 Claims. (Cl. 183—2.7)

This invention relates to improvements in liquid and gas separators and more particularly relates to a spherical oil and gas separator.

Oil and gas separators heretofore utilized have for the most part been cylindrical in shape and either vertically or horizontally disposed. In the vertical separators the oil and gas mixture was ordinarily directed tangentially into the tank to cause a whirling action to spread the liquid upon the walls in a film thought to be conducive to separation of the gas from the oil. The liquid collected at the bottom of the tank and a baffle type mist extractor was provided at the top with an oil collecting tube leading from the mist extractor down to the body of oil collected at the bottom.

Horizontal separators have customarily comprised rather large elongated and baffled tanks which provide for a long and torturous passage of the gas and oil mixture so as to permit the oil to settle out before the gas reaches the outlet end of the tank where a baffle type mist extractor was provided with an oil collector tube leading to a liquid reservoir.

In addition to the foregoing a lesser number of spherical separators have been placed in use and these have been generally operated in a manner substantially analogous to the operation of the vertical cylindrical separators. That is to say, the oil and gas mixture was introduced tangentially into the tank to create the usual whirling action, with the liquid being collected at the bottom, and with the vapor passing through a baffle type mist extractor having a conventional collector tube leading therefrom to the collected oil pool.

While these separators have proven generally satisfactory they have not provided a high capacity efficient separating action in a compact unit and have normally entailed a mist extractor pressure drop which made the use of a differential pressure liquid level controller impractical.

According to the present invention, a liquid and gas separator is provided in the form of a compact spherical tank with all of the known advantages of this shape tank, in addition to the advantages of low velocity separation and high capacity mist extraction with an extremely low pressure drop through the mist extractor. Full advantage is taken of the well known physical principle that a moving body of gas loses much of its ability to carry along entrained liquid particles when its velocity is greatly reduced, and this is accomplished by utilizing the largest available cross sectional area of the tank, unhampered by interior baffles of any sort which would tend to keep the gas velocity high in that area. The realization of this result in the relatively limited volume of a spherical tank is due to a large extent to the concept of rapidly reducing the momentum, as well as the velocity, of the slugs of liquid contained in the incoming stream of liquid and gas, by providing a baffle of the proper shape and position to not only arrest the travel of the streams and slugs of liquid, but also to bounce them back against the interior wall of the tank and to rebounce them back and forth until their momentum has been dissipated to such an extent that they fall vertically by force of gravity into the oil reservoir in the lower part of the tank.

This rapid reduction of the velocity and momentum of the incoming mixture of liquid and gas permits a substantially quiescent separating zone to be established in the center of the tank in which substantially streamlined flow conditions exist. A mist extractor of wide lateral area and short longitudinal thickness is provided immediately above this quiescent zone and acts in a very efficient manner due to the low velocity of gases passing therethrough. The shape and size of the mist extractor minimize the pressure drop therethrough and the efficient extraction action provides an outflowing gas which is substantially dry. The customary drain pipe to remove the extracted liquid is not used and the extracted liquid falls in the manner of rain to the bottom of the tank. The low pressure drop through the extractor and the high efficiency of extraction yielding a dry gas make it possible to utilize the separator with a pressure differential pilot operated liquid level controller.

It is accordingly a primary object of this invention to provide a spherical liquid and gas separator which performs an efficient, high capacity cleaning and separating action on an incoming stream of mixed liquid and gas while utilizing a minimum of parts and space.

It is another object of the present invention to provide a spherical liquid and gas separator utilizing low velocity separation in an unbaffled substantially quiescent zone.

It is another object of the present invention to provide a spherical liquid and gas separator of a spherical shape in which both the velocity and momentum of the slugs and streams of liquid are rapidly reduced as it enters the tank with the first separating action being confined to an area closely adjacent the liquid and gas inlet.

It is another object of the present invention to provide a spherical liquid and gas separator of the spherical type in which large liquid slugs are prevented from being carried entirely across the tank and are prevented from dispersing into small drops and droplets which have a tendency to be carried along by the outwardly moving gas.

It is another object of the present invention to provide a spherical liquid and gas separator of high capacity utilizing a high efficiency mist extractor which causes only a very low pressure drop and which does not utilize the customary drain pipe to conduct away the extracted liquid.

It is another object of the present invention to provide a spherical liquid and gas separator having a centrally located substantially streamlined flow zone and having a mist extractor of large lateral area so placed as to most efficiently pass the gas at low velocities so as to allow the extracted liquid to coalesce and form droplets on the undersurface of the extractor to fall downwardly in the manner of rain.

It is another object of the present invention to provide such a spherical liquid and gas separator and mist extractor so that the falling rain like drops of liquid meet with an upwardly rising flow of gas which moves at a velocity so slow as to be incapable of carrying the rain like drops upward toward the mist extractor.

It is another object of the present invention to provide a spherical liquid and gas separator having a low velocity streamlined flow zone therein and having a porous mass mist extractor of large lateral area and small thickness defining one surface of such zone and being so located in the tank that gas flow therethrough is at a low velocity to permit dry gas to be removed from the tank adjacent the mist extractor at a pressure suitable for operating a pilot valve actuated pressure differential liquid level controller.

It is another object of the present invention to provide such a spherical liquid and gas separator in which the mist extractor is located in a cocked position in the tank to increase the overall capacity of the separator while still obtaining efficient clean separation at a low pressure drop.

Further objects and advantages of the invention will become apparent upon reference to the appended specification and claims and the attached drawings wherein:

Figure 1 is a vertical cross sectional view of a liquid and gas separator according to the present invention; and Figure 2 is a horizontal cross sectional view of the separator of Figure 1 taken along the line 2—2 of Figure 1.

Referring more particularly to the figures of the drawings there is shown in Figures 1 and 2 a liquid and gas separator consisting of a spherical tank 10 provided with a suitable support such as the base skirt 12. The tank 10 is provided with an inlet nozzle 14 for the influent stream of liquid and gas, an outlet nozzle 16 for the separated gas, an outlet nozzle 18 for the separated liquid and a sediment drain aperture 20. A mist extractor 22 is mounted across the top of the tank and consists of a pair of parallel foraminous plates 24 and 26 which are secured to the inner surface of the tank by any suitable means, such as by welding. The space between the plates 24 and 26 is filled with a material such as Raschig rings or other rough and porous mass. Since the plates 24 and 26 are parallel the thickness of the mist extractor is uniform and this provides an even flow of gas and prevents channeling. The mist extractor is preferably unsymmetrically located with respect to the vertical center line of the tank 10 and, as may be seen in Figure 1, is cocked so as to converge towards a horizontal plane through the center of the tank as it extends away from the inlet nozzle 14, and this cocked position brings about several beneficial results material to the overall efficiency of the separator. Thus, the volume of the lowest velocity gas area in the middle of the separator, i. e., below the mist extractor 22 and above the liquid level, is at a maximum while the important lateral area of the mist extractor is kept high. A primary separation zone is provided around the inlet nozzle 14 to prevent liquid particles from striking the mist extractor in a manner to be discussed hereinafter.

This placement of the mist extractor near the widest portion of the tank permits the gas to pass therethrough with little or no tendency for an increase in gas velocity and this prevents the upwardly moving gas from entraining anything but the finest liquid particles which are separated by the mist extractor. The resultant slow flow of gas through the extractor permits it to work at a maximum efficiency and the cocked position eliminates localized channeling which would result with higher gas velocities with resulting detrimental effects on the separation process. The lower velocities also bring about a lower friction loss and this effect, coupled with the large mist extractor area and small thickness minimizes the pressure drop.

It will be seen from reference to Figure 1, that the mist extractor defines the lower surface of a small gas zone 25 thereabove which diminishes in cross section as it approches the top of the tank. The mist extractor is placed contiguous the non-turbulent streamlined flow zone 27 and has a large diameter, preferably at least two-thirds the tank diameter, and this insures that the gas passing therethrough has not yet materially increased its velocity. It will be apparent to those skilled in the art that the velocity of the upwardly flowing gas increases as the tank cross section decreases and that the velocity of the gas decreases as the tank cross section increases. Thus once the gas has passed the mist extractor into the zone 25 its velocity rapidly increases.

An outlet opening 28 for a dry gas supply line to the pilot valve of a differential liquid level controller is provided in the small gas zone above the mist extractor 22 closely adjacent to the mist extractor at a large diameter portion of the tank. Since the gas velocity at this point is low and the pressure drop through the extractor is also low, the pressure is substantially that which exists at the surface of the liquid at the bottom of the tank.

These conditions are important since they permit operation of the separator with a pressure differential pilot operated liquid level controller valve rather than with the conventional float type valve. This type of pilot operated liquid level controller requires an absolutely dry supply of gas which is at substantially the same pressure as the gas inside the separator acting upon the surface of the liquid therein. Should the gas which is fed to the pilot of the pressure differential liquid level controller valve contain even a small amount of liquid, this would accumulate above the pilot diaphragm and prevent proper operation of the pilot valve. The low pressure drop through the mist extractor makes it possible to obtain a perfectly dry supply gas from the separator at a pressure substantially the same as the pressure of the gas in contact with the liquid level.

In addition to the gas outlet 16 and differential pressure liquid level control outlet 28, the top of the tank defining the zone 25 is also provided with an outlet opening 30 for a pressure gauge (not shown) and an outlet opening 32 for a safety pressure relief valve (not shown). The lower portion of the shell 10, below the mist extractor 22, is provided with suitably spaced and located outlet openings 34 and 36, to accommodate a liquid level sight gauge (not shown) and an outlet opening 38 for a liquid supply line to the pilot valve of a pressure differential liquid level controller. The outlet opening 28 is connected by pipe 29 to a conventional pressure differential liquid level control pilot valve shown diagrammatically at 31, and the outlet opening 38 is also connected to this unit through a pipe 33. A flow control valve 35 is provided in the outlet pipe 37 and is controlled by the pilot valve arrangement in the usual manner as diagrammatically indicated by the broken line 39.

While the liquid level is preferably controlled by a pressure differential liquid level controller and pilot of the type which does not require the use of an inside float, it is possible to use such a float liquid level controller apparatus with the separator of this invention and such a float may be installed through the flanged opening 40 located in the side of the tank 10.

A splash grid 42 is provided in the bottom of the tank 10 and consists of a plate 44 to which are attached perpendicular plates 46 and 48 as may best be seen in Figure 2. The plates 44, 46 and 48 may be secured to the inner surface of the tank in any suitable manner, such as by welding, and are spaced from the bottom of the tank as is seen in Figure 1.

An angular baffle 50 is provided immediately adjacent the inlet nozzle 14 and is supported in position by means of a pair of brackets 52 and 54 which may conveniently be welded to the baffle and to the inner surface of the tank. The baffle 50 is substantially the shape of piece of angle iron and has its legs directed toward the inlet nozzle 14. As may be seen from Figure 1, these legs are of such a width as to extend slightly beyond the diameter of the inlet nozzle 14 so that all incoming slugs of liquid are prevented from reaching the low velocity zone 27 in the center of the tank. The baffle 50 terminates short of the tank wall as may be seen in Figure 2.

The operation of the separator is as follows:

A mixed stream of liquid (oil, water, etc.) and gas enters the tank 10 at a relatively high velocity through the inlet nozzle 14. Streams and slugs of liquid strike against the angular baffle 50 with considerable force and rebound back against the wall of tank 10 and bounce back and forth until their momentum has been dissipated to such an extent that they fall directly downward by force of gravity along the inside wall of the tank 10, or approximate thereto, and enter the liquid reservoir 56 in the lower part of the tank. The considerable spacing between the lower surface of the mist extractor 22 and the primary separating zone surrounding the inlet 14 prevents a splashing of large slugs against the mist extractor in a manner which might interfere with its low pressure drop extracting action. The gas entering the inlet nozzle 14 does not bounce back and forth but immediately escapes from above and below and from both ends of the angular baffle 50 and enters the large wedge shaped middle section of the tank, i. e., the section 27 between the mist extractor 22 and the splash grid 42, where its velocity is greatly reduced and turbulence at a minimum. In this area under such low velocity streamlined flow conditions the gas loses its ability to hold liquid drops above a critical size and these fall vertically downward under force of gravity to the liquid reservoir section 56.

The gas stream containing fine liquid particles below this critical size moves upward at a still low velocity and enters uniformly over the entire lower surface of the mist extractor 22, which is preferably a bed of Raschig rings of suitable size and thickness supported in an inclined position as shown in Figure 1. The gas stream then slowly follows a torturous upward course through the bed of Raschig rings wherein it comes into intimate contact with the wetted interior and exterior surfaces of the rings. The fine particles of liquid entrained in the gas stream contact the wetted surface of the Raschig rings and coalesce with the liquid films which are already held on the rings by surface tension. As the liquid films on the Raschig rings thus become thicker, drops of liquid of a size too large to be held in suspension by the slowly upwardly moving gas form and fall away from the rings and continue to fall downward, much as rain, through the slowly moving gas stream until they reach and comingle with the liquid body in the liquid reservoir 56. The stream of perfectly dry gas leaving the top surface of the mist extractor 22 rapidly speeds up and leaves the separator at high velocity through the gas outlet nozzle 16 located at the top of the tank 10. The oil or other liquid leaves the separator through the liquid outlet nozzle 18 located near the bottom of the tank 10 and sand and sediment is drained from the separator occasionally, as required, through the sediment drain aperture 20 located at the bottom of the tank.

It will thus be seen that there has been provided a liquid and gas separator which, in a relatively small spherical tank, provides a high capacity, highly efficiently separating action and permits the use of a pressure differential type liquid level controller. The movement of the large liquid slugs are confined to a small area immediately adjacent the entrance to the tank and this confinement of the movement of the large liquid slugs prevents them from being carried by their own momentum part way or entirely across the tank and thus prevents their dispersion into small drops which have a greater tendency to be carried along by entrainment in the gas stream. Turbulence in the large unbaffled central part of the tank is reduced to a minimum and this further promotes settlement of entrained liquid from the slowly moving gas stream in that area of the tank. Thus the vast majority of the liquid is separated from the gas within the small area immediately adjacent the inlet to the tank and this separated liquid joins the previously separated liquid in the reservoir in the bottom of the tank leaving the large remaining space in the tank free to be utilized for the more difficult task of separating the small drops and fine liquid particles from the gas stream before it leaves the tank. The central portion of the tank is completely unbaffled and the mist extractor does not utilize the conventional drain pipe to conduct the extracted liquid to the reservoir in the bottom of the tank. Where such drain pipes are utilized there is an ever present danger that they may act as upward channels for gas instead of downward channels for the liquid.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A liquid and gas separator comprising in combination: a spherical tank, a liquid and gas inlet in the wall of said tank and substantially in a horizontal plane passing through the center of said tank for delivering a liquid and gas mixture substantially radially into said tank, trough shaped baffle means in said tank closely adjacent said inlet and in the path of said inflowing liquid and gas mixture, said baffle means being horizontally arranged to direct inflowing liquid back upon the wall through which it entered, a liquid outlet in the lower portion of the tank, a gas outlet in the upper portion of the tank, and a mist extractor between said gas and liquid outlets and above said plane, said mist extractor comprising a pair of substantially parallel foraminous plates having a porous mass therebetween, said plates being attached to the walls of said tank and having a width appreciably greater than the spacing between said plates, said plates lying at an acute angle to said plane.

2. A liquid and gas separator comprising in combination: a spherical tank, a liquid and gas inlet in the wall of said tank and substantially in a horizontal plane passing through the center of said tank for delivering a liquid and gas mixture substantially radially into said tank, trough shaped baffle means in said tank closely adjacent said inlet and in the path of said inflowing liquid and gas mixture, said baffle means being horizontally arranged to direct inflowing liquid back upon the wall through which it entered, a liquid outlet in the lower portion of the tank, a gas outlet in the upper portion of the tank, and a mist extractor between said gas and liquid outlets and above said plane, said mist extractor comprising a pair of substantially parallel, foraminous plates having a porous mass therebetween, said plates being attached to the walls of said tank and having a diameter greater than two thirds the diameter of said tank and being spaced a distance which is a small fraction of said diameter.

3. A liquid and gas separator comprising in combination: a spherical tank, a liquid and gas inlet in the wall of said tank and substantially in a horizontal plane passing through the center of said tank for delivering a liquid and gas mixture substantially radially into said tank, trough shaped baffle means in said tank closely adjacent said inlet and in the path of said inflowing liquid and gas mixture, said baffle means being horizontally arranged to direct inflowing liquid back upon the wall through which it entered, a liquid outlet in the lower portion of the tank, a gas outlet in the upper portion of the tank, and a mist extractor between said gas and liquid outlets and above said plane, said mist extractor comprising a pair of substantially parallel foraminous plates having a porous mass therebetween and being attached to the walls of said tank, said plates having a diameter greater than two thirds the diameter of said tank and being spaced apart a distance which is a small fraction of said diameter, said plates being mounted in said tank so as to converge towards said plane at the side of said tank opposite said baffle means.

4. A liquid and gas separtor comprising in combination: a spherical tank, a liquid and gas inlet in the wall of said tank and substantially in a horizontal plane passing through the center of said tank for delivering a liquid and gas mixture substantially radially into said tank, baffle means in said tank closely adjacent said inlet and in the path of said inflowing liquid and gas mixture, said baffle means being so arranged as to direct inflowing liquid back upon the wall through which it entered, a liquid outlet in the lower portion of the tank, a planar mist extractor comprising a disk shaped porous mass having a diameter at least two thirds the diameter of said tank and having a thickness which is a small fraction of its diameter, said mist extractor being inclined with respect to said plane to converge therewith as it extends away from said inlet, said mist extractor being secured in said tank above said plane to define with the upper tank walls a small gas zone in the upper part of the tank, and to define with the surface of liquid in the bottom of said tank and said tank walls a non-turbulent gas zone which is totally unobstructed beyond said baffle, a gas outlet in said small gas zone in the uppermost portion of said tank, a differential liquid level controller pilot valve, a dry gas outlet in said small gas zone closely adjacent said mist extractor connected to said pilot valve, and a liquid outlet in the lower portion of said tank connected to said pilot valve.

References Cited in the file of this patent

UNITED STATES PATENTS

| | | |
|---|---|---|
| 1,471,705 | Porter | Oct. 23, 1923 |
| 1,512,358 | Neill | Oct. 21, 1924 |
| 2,657,760 | Glasgow | Nov. 3, 1953 |
| 2,664,170 | Walker et al. | Dec. 29, 1953 |
| 2,678,699 | Fowler | May 18, 1954 |